April 14, 1931.  B. F. ALINK  1,801,131
QUACK GRASS RAKE
Filed June 19, 1930  3 Sheets-Sheet 2
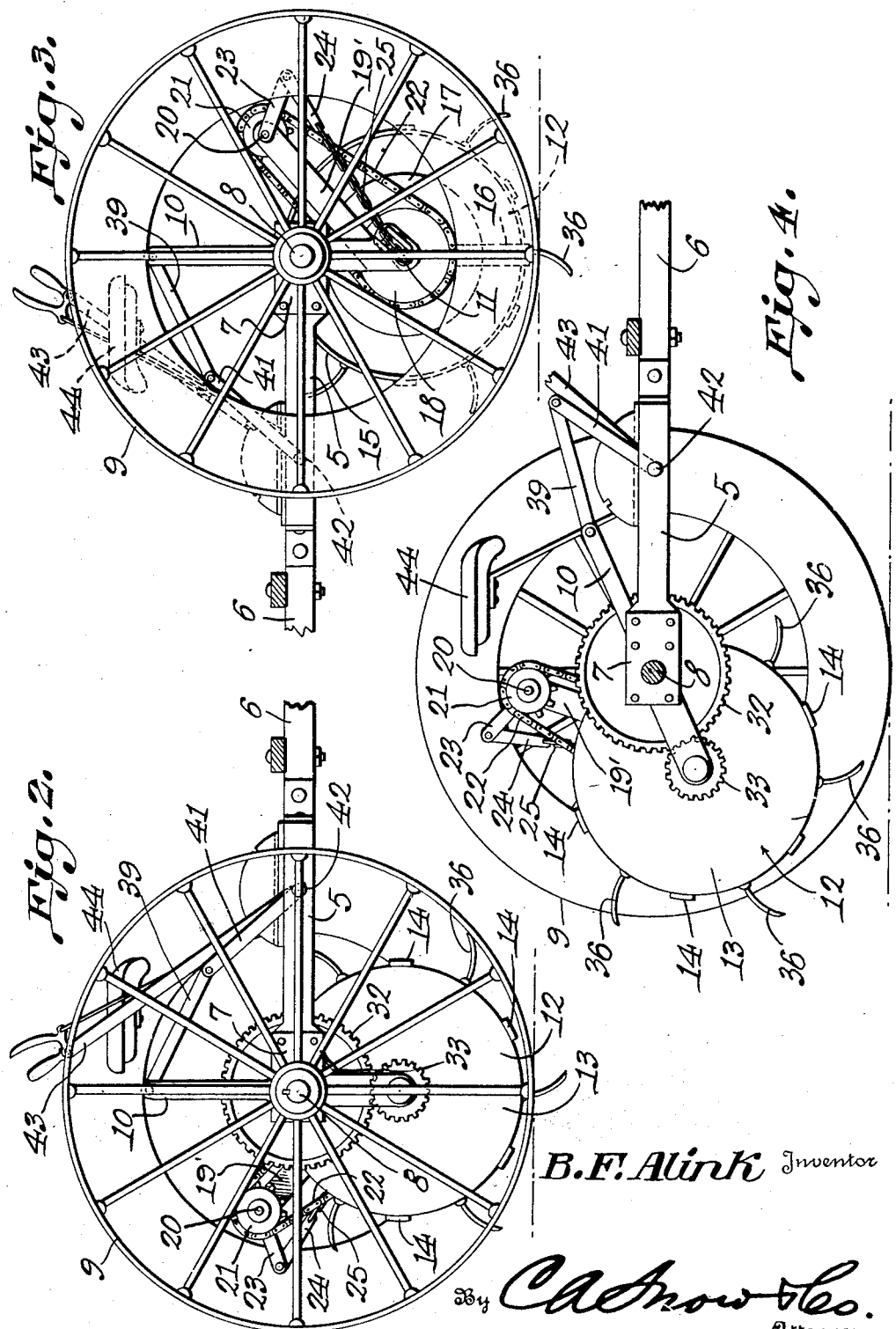
B. F. Alink, Inventor
By C. A. Snow & Co., Attorneys.

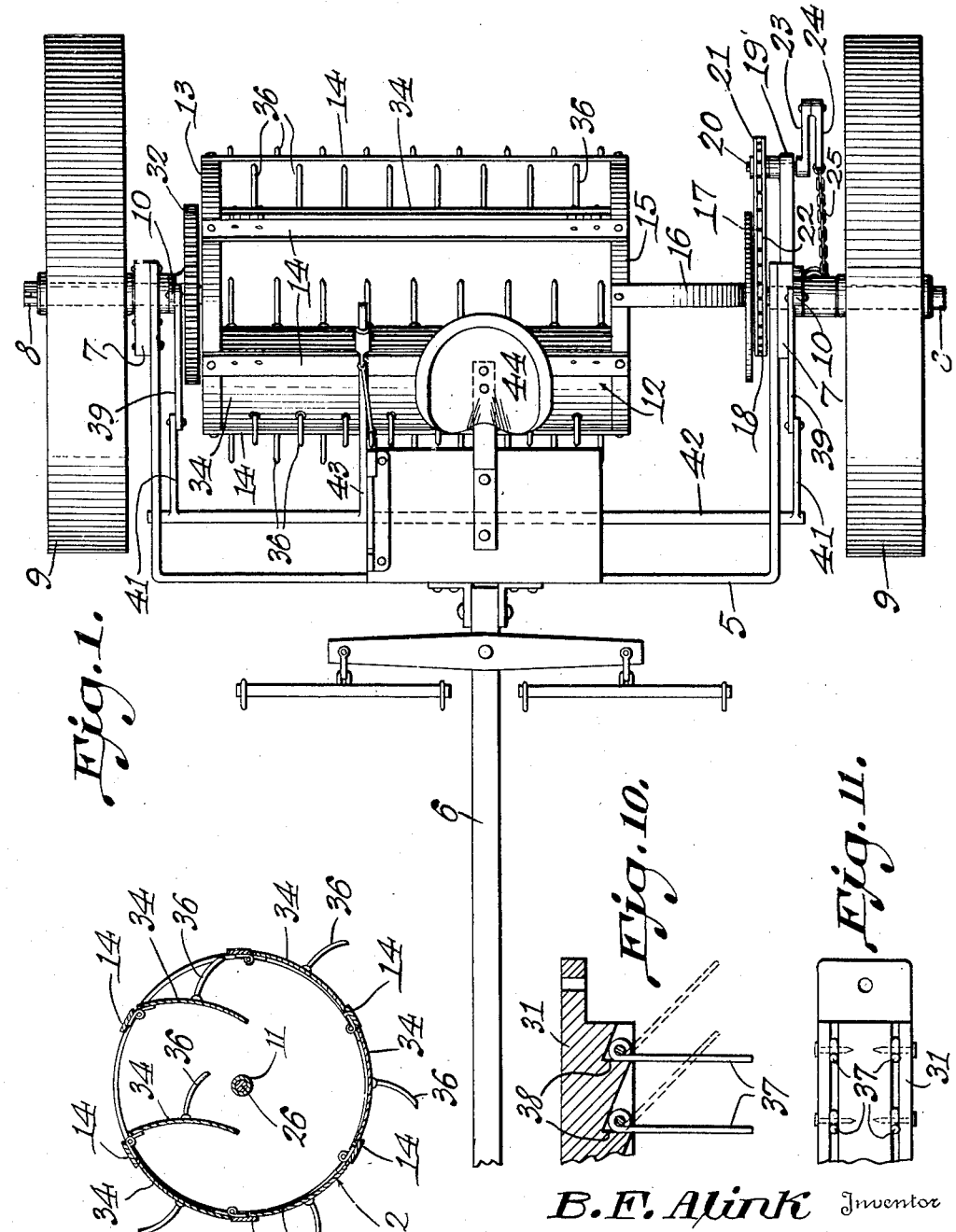

April 14, 1931.                B. F. ALINK                1,801,131
                            QUACK GRASS RAKE
                         Filed June 19, 1930         3 Sheets-Sheet 3
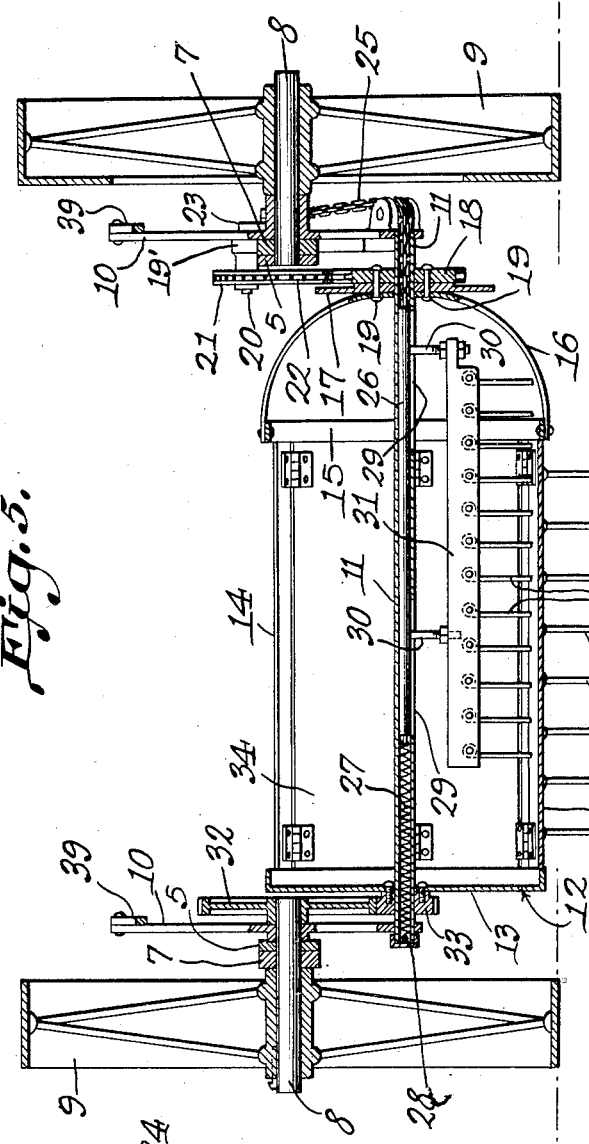
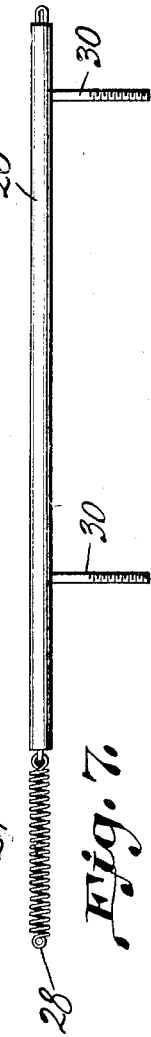
B. F. Alink Inventor
By C.A.Snow&Co.
Attorneys.

Patented Apr. 14, 1931

1,801,131

UNITED STATES PATENT OFFICE

BENJAMIN F. ALINK, OF SPRING VALLEY, MINNESOTA

QUACK-GRASS RAKE

Application filed June 19, 1930. Serial No. 462,294.

This invention relates to a rake especially designed for use in raking quack grass or the like material, the primary object of the invention being to provide a machine which may be moved over a plowed field, the machine being so constructed that the quack grass will be picked up and discharged laterally of the rake.

An important object of the invention is to provide a rake of this character including a rotating drum having a plurality of pivoted plates mounted thereon, the plates being supplied with teeth curved in such a way that they will pick up the quack grass and carry the quack grass to the upper side of the drum, where the quack grass will fall by gravity into the interior of the drum.

Another object of the invention is the provision of means within the drum for engaging the quack grass picked up by the teeth, to move the same laterally through the open end of the drum, discharging the quack grass in a row at one end of the drum, so that the quack grass may be readily removed.

A still further object of the invention is to provide an adjustable drum, so that the teeth carried by the drum may operate at various depths, depending on the condition of the soil over which the rake is moving.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a quack grass rake constructed in accordance with the invention.

Figure 2 is a side elevational view thereof.

Figure 3 is a side elevational view taken from the opposite side of the machine.

Figure 4 is a sectional view through the rake.

Figure 5 is a longitudinal sectional view through the drum and frame of the rake.

Figure 6 is an elevational view of the hollow shaft forming a part of the device.

Figure 7 is a view illustrating the reciprocating rake supporting bar.

Figure 8 is a fragmental perspective view of one of the hinged plates of the drum.

Figure 9 is a transverse sectional view through the drum.

Figure 10 is a fragmental sectional view of the reciprocating rake.

Figure 11 is a bottom plan view thereof.

Referring to the drawings in detail, the rake comprises a substantially U shaped frame 5 to which the usual tongue 6 is secured, however, it is to be understood that a suitable hitch may be employed for connecting the rake to a tractor, should it be desired to use a tractor in moving the rake over the surface being raked.

The frame is formed with bearings 7 in which the stub axles 8 operate, the axles 8 accommodating the wheels 9, one of which being shown as secured to an axle 8.

Mounted on the axles 8, are supporting arms 10 that are formed with openings intermediate their ends, to receive the axles 8, the lower ends of the arms 10 being formed with openings to receive the tubular shaft 11, that acts as a support for the rotary drum 12, forming an important feature of the invention, and to be hereinafter more fully described. The drum 12 comprises an end member 13 that closes one end thereof, there being provided bars 14 connected to the end member 13 at one of their respective ends, the opposite ends of the bars being connected to the band 15, disposed at the opposite end of the drum.

Secured to the band 15, is a curved bar 16 that is formed with an opening through which the tubular shaft 11 extends, providing a support for this end of the drum 12. Secured to the bar 16 is a disk-like shield 17 which is of a diameter greater than the diameter of the sprocket 18 which is secured to the shield 17 by means of the bolts 19 that secure the shield to the bar 16. Thus it will be seen that the teeth of the sprocket 18 are protected against the material deposited in the drum, to the end that the chain operating over the sprocket will not become displaced.

The reference character 19' designates an arm that is secured to one of the supporting arms 10, and extends laterally therefrom, the arm 19' having a bearing at its outer end to receive the stub shaft 20 on which the sprocket 21 is mounted. Rotary motion is transmitted from the sprocket 18 to the sprocket 21, by means of the chain 22.

As shown, the shaft 20 extends through the bearing in which it is mounted, and connects with the arm 23 which rotates therewith, the arm 23 having pivotal connection with the link 24, to which one end of the chain 25 is connected. This chain 25 extends into one end of the hollow shaft 11, where it connects with the rod 26 to which the coiled spring 27 is connected, the coiled spring 27 having one of its ends secured within the tubular shaft 11, as at 28. Thus it will be obvious that due to this construction, rotary movement of the drum will impart rotary movement to the sprocket 21, through the sprocket 18 and chain 22.

As the shaft 20 rotates, the arm 23 is rotated, causing the link 24 to pull the chain 25 through the hollow shaft, in one direction, the spring acting to return the chain and rod 26, connected thereto.

The shaft 11 is formed with elongated openings 29 through which the arms 30 extend, the arms 30 being connected to the rake 31, so that the rake will be moved longitudinally of the drum 12, to rake material through the drum, discharging the material in a row adjacent to one end of the drum.

Keyed or otherwise secured to the axle 8 at one side of the machine, is a gear 32 that is in mesh with the pinion 33 which is secured to the end member 13 of the drum, to impart rotary movement to the drum when the machine is drawn over the surface being raked.

The drum 12 embodies a plurality of curved plates 34 that are hingedly connected to the bars 14, as clearly shown by the drawings, the plates being of constructions to swing inwardly, but restricted in their outward movements, by the bars 14 that provide rests for the plates.

Curved teeth 36 extend outwardly from the plates 34, and act to pick up the quack grass which has been loosened by the plowing and harrowing of the ground surface. As the plates 34 reach the upper side of the drum, they fall by gravity to positions as shown by Figure 9 of the drawings, discharging the material into the lower portions of the drum where it is raked laterally and discharged at the open end of the drum, by means of the rake 31.

It might be further stated that the teeth 37 of the rake 31 are pivotally connected with the rake head, the rake head being provided with shoulders 38, shown more clearly by Figure 10 of the drawings, against which the teeth 37 engage during one stroke of the rod 26. Due to this construction, it will be obvious that when the rake 31 moves outwardly, or to a position to discharge the material picked up by the drum, the teeth 37 will be supported in upright positions, but will be permitted to swing upwardly to positions as shown in dotted lines in Figure 10, upon the return movement of the rod 26, so that the teeth 37 will ride over the quack grass or material in the drum, as the rake moves into the drum.

Pivotally connected to the upper ends of the arms 10, are links 39 that have pivotal connection with the arms 41 formed at the ends of the rod 42, which rod 42 is pivotally mounted in bearings formed in the frame 5 of the machine.

The reference character 43 designates an operating lever that has connection with the rod 42, so that the operator seated on the seat 44 may, by moving the lever, elevate or lower the drum 12, to throw the same into and out of operation, or to regulate the depth of operation of the teeth 36.

In the use of the device, the rake is moved over a field which has been plowed, whereupon the drum 12 revolves, the teeth 36 picking up the quack grass loosened by the plowing operation. As the teeth move to the limits of their upward movements, the plates 34, on which the teeth are mounted, fall by gravity, discharging the quack grass into the center of the drum 12.

The quack grass is now picked up by the rake 31 which carries the quack grass laterally, discharging it through the open end of the drum, in a row to be readily picked up and removed, in any well known manner.

I claim:—

1. A rotary rake comprising a frame, a rotary drum mounted on the frame, pivoted plates forming a part of the drum and adapted to swing inwardly, teeth on the plates for picking up material and carrying the material to the upper side of the drum, said plates adapted to swing inwardly to discharge the material, and means for raking the material from the drum.

2. A rotary rake comprising a frame, a rotary drum mounted on the frame, said drum comprising pivoted plates, teeth extending from the plates, said plates adapted to swing inwardly to discharge material into the interior of the drum, one end of said drum being open, and a reciprocating rake operating within the drum to remove material from the drum.

3. A rotary rake comprising a frame, a drum mounted for rotary movement on the frame, said drum comprising a plurality of hinged plates, curved teeth extending from the plates, said plates adapted to swing into the interior of the drum to discharge material into the interior of the drum, means for adjusting the drum with respect to the ground surface over which the rake is moving, and means for forcing the material through the drum.

4. A rotary rake comprising a frame, a hollow shaft mounted on the frame, a drum mounted for rotary movement on the hollow shaft, means for rotating the drum, a reciprocating rod operating within the hollow shaft, a rake operated by the rod and movable longitudinally of the drum, means forming a part of the drum for picking up material and discharging the material into the interior of the drum, and means for reciprocating the rake to discharge material at one end of the drum.

5. A rotary rake comprising a frame, stub axles extending from the frame, supporting wheels mounted on the stub axles, supporting arms mounted on the axles, bearings in the arms, a hollow shaft supported in the bearings, a rotary drum mounted on the shaft, means on the drum for picking up material and discharging the material into the interior of the drum, a rake mounted for reciprocatory movement within the drum, a rod mounted within the hollow shaft and connected with the rake to operate the rake, means for operating the rod, and means for adjusting the drum.

6. A rotary rake comprising a frame, a drum mounted on the frame, a hollow shaft on which the drum operates, a rod mounted for sliding movement in the hollow shaft, a rake, means for connecting the rod to the rake, a spring within the hollow shaft and connected with the rod for moving the rod in one direction, means for moving the rod in the oposite direction to operate the rake, and means on the drum for delivering material to the interior of the drum.

7. A rotary rake comprising a frame, a drum mounted for rotary movement on the frame, one end of the drum being open, hinged plates on the drum, curved teeth on the plates, said teeth adapted to pick up material, said plates adapted to swing inwardly to discharge material into the interior of the drum, and means operating within the drum for forcing material through the open end of the drum.

8. A rotary rake comprising a frame, a rotary drum mounted on the frame, said drum comprising a plurality of hinged plates, said plates adapted to swing inwardly to discharge material into the interior of the drum, means for restricting outward movement of the plates, and a reciprocating rake within the drum for forcing material from the drum.

9. A rotary rake comprising a frame, a rotary drum mounted on the frame, said drum comprising a plurality of hinged plates, curved teeth on the plates for picking up material, said plates adapted to swing inwardly to discharge material into the interior of the drum, said drum having an open end, a reciprocating rake within the drum, and means for operating the rake to force material through the open end of the drum.

In testimony that I claim the foregoing as my own, I have hereto affixed my signature.

BENJAMIN F. ALINK.